Aug. 18, 1936. R. M. JAMES 2,051,259
FISHING REEL
Filed July 10, 1935
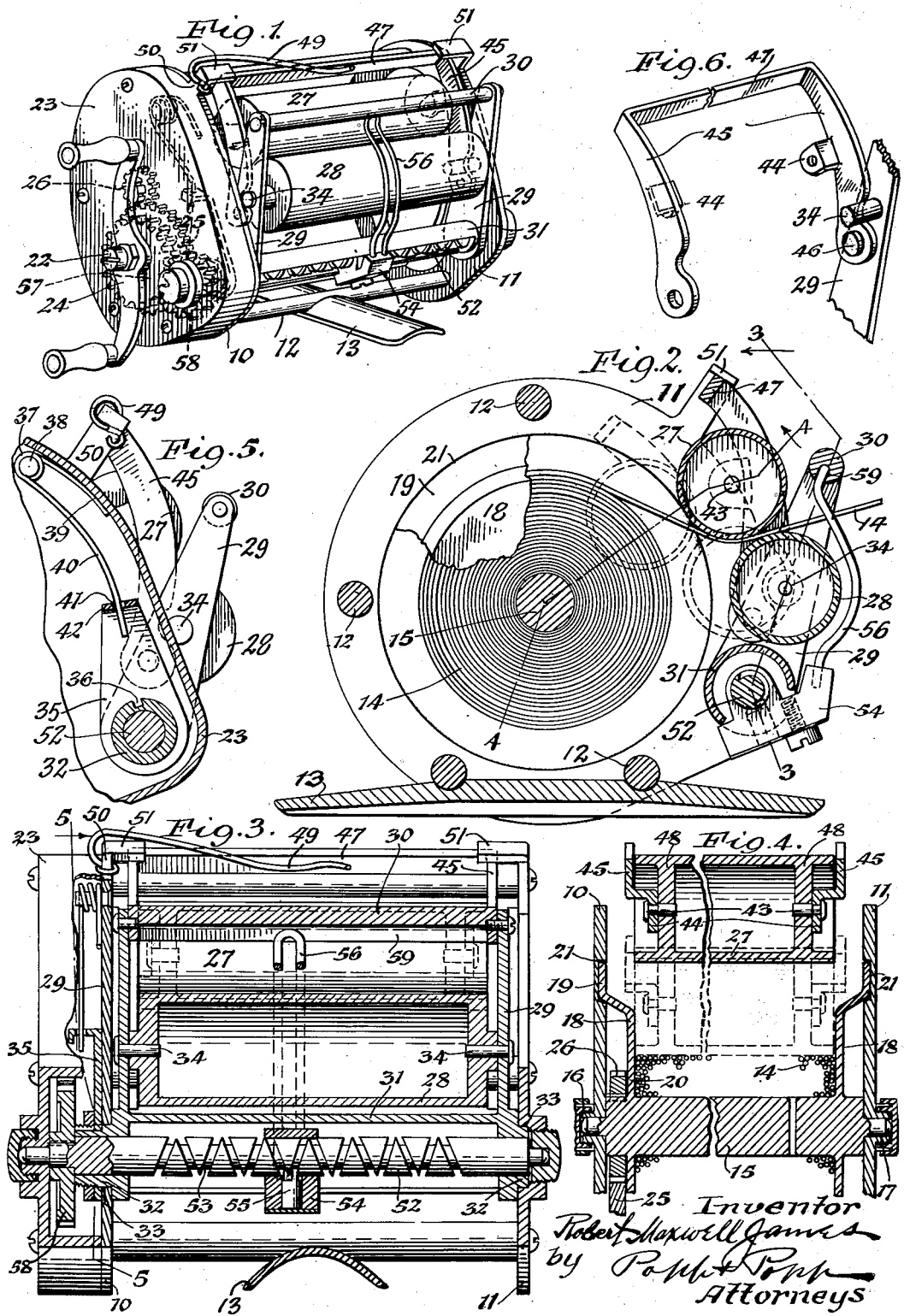

Patented Aug. 18, 1936                                                      2,051,259

UNITED STATES PATENT OFFICE 2,051,259

FISHING REEL

Robert Maxwell James, Kenmore, N. Y.

Application July 10, 1935, Serial No. 30,655

12 Claims. (Cl. 242—84.4)

This invention relates to a fishing reel, and more particularly to means for preventing backlash or snarling of the fish-line during the operation of casting the bait.

As is well-known to those experienced in the use of a fishing reel having no provision for preventing back-lash of the line, any over-run of the reel after the bait has reached the limit of its throw will cause unwinding of the fish-line from the reel which causes the line to back-lash and to become snarled which is not only objectionable in that it interferes with the sport of fishing but also often involves the loss of a good deal of time in order to unsnarl the line before normal casting can be resumed.

It is the object of this invention to provide simple and efficient means whereby over-running of the spool when unwinding the line therefrom during a casting operation is positively prevented and thus avoids back-lashing or snarling of the line, so that fishing can be practiced without any interruption from this cause.

In the accompanying drawing:

Figure 1 is a perspective view of a fishing reel equipped with a satisfactory form of my invention.

Figure 2 is a vertical transverse section thereof, on an enlarged scale.

Figures 3 and 4 are longitudinal sections, taken on the correspondingly numbered lines in Fig. 2.

Figure 5 is a fragmentary transverse section, taken on line 5—5 Fig. 3.

Figure 6 is a fragmentary perspective view showing the support for the inner control roller and a part of the support for the outer control roller.

In the following description similar characters of reference indicate like parts in the several views of the drawing.

The general organization of the fishing reel which is adapted to receive this improvement may be of any suitable and well-known construction, that shown in the drawing being constructed as follows:

The main frame of the fishing reel consists generally of front and rear end heads 10, 11 arranged at the front and rear ends of the reel, and a plurality of longitudinal bars 12 arranged in an annular row and connecting the front and rear heads 10 and 11. This frame may be mounted upon the side of the fish pole in any approved manner, for example by means of a saddle 13 which is secured to the underside of the reel frame, and is adapted to be fastened to the side of the fishing pole in any suitable and well-known manner.

Arranged lengthwise in the space between the heads and longitudinal bars of the frame is a spool or drum upon which the fish-line 14 is adapted to be wound, which spool in the preferred construction comprises a longitudinal axle 15 journaled at its opposite ends by suitable bearings 16, 17 on the end heads of the frame, and two flanges or disks 18, 18 arranged on opposite ends of the axle, and each having its marginal part 19 offset outwardly relatively to the inner part 20 thereof, and rotating in an annular groove 21 formed in the adjacent inner side of the respective head of the frame.

Any approved means may be employed for rotating this reel, for instance, by means of a driving shaft 22 rotatably mounted on a casing 23 which is secured to the front frame head 10, a hand crank 24 which is secured to the outer end of the driving shaft 22 and adapted to be turned manually, and a driving gear wheel 25 secured to the driving shaft 22 within the casing 23 and meshing with the gear pinion 26 on the front end of the axle 15, as shown by dotted lines in Fig. 1, and by full lines in Fig. 4.

The means whereby the spool is prevented from over-running and causing the line to back-lash or snarl, in accordance with my invention, are constructed as follows:—

The numeral 27 represents an inner control roller which is arranged lengthwise on the front side of the reel and adapted to engage with the outer side of the fish line, and the numeral 28 represents an outer control roller arranged in front of the spool and below the inner roller and adapted to engage with the underside of the fish line opposite to the peripheral part of the inner roller which engages with the upper or outer side of the line, as shown in Fig. 2.

Means are provided for permitting the inner control roller to move bodily toward and from the periphery of the wound part of the fish line and to hold the same yieldingly in engagement therewith, and means are also provided for supporting the outer control roller so that the same is movable bodily toward and from the inner control roller and is yieldingly pressed toward the inner control roller.

Although this may be variously accomplished it is preferable to employ means which are constructed as follows:

The outer control roller is rotatably mounted on a rocking support or yoke which in the present instance comprises two rock arms 29 which are arranged between the inner sides of the front parts of the frame heads 10, 11 and have their lower or inner ends pivotally mounted thereon, while their outer or upper ends are connected by means of a longitudinal bar 30.

At their inner ends the arms 29 are connected by means of a hollow shaft 31 which is preferably of C-shaped form in cross section and has its concave inner side opening downwardly so as to form a casing for part of the means for winding the fish line evenly on the spool, as will hereinafter be described. The inner or lower ends of the arms 29 are provided with trunnions 32 which are pivoted in suitable bearings 33 on the adjacent parts of the frame heads 10, 11, as best shown in Fig. 3.

The means for rotatably supporting the outer control roller 28 on the arms 29 preferably consist of pivot pins or trunnions 34 arranged axially on the outer arms 29 and engaging with pivot openings which are formed centrally in the opposite ends of the outer control roller, as shown in Figs. 2 and 3.

Means are employed which tend constantly to move the outer control roller and its supporting yoke yieldingly inward toward the inner control roller, which means may be varied but those shown in the drawings have been found satisfactory and comprise a shifting arm 35 arranged within the casing 23 and having its inner end connected by means of a key 36 with the adjacent trunnion 32 of the yoke which carries the outer control roller, and a tension spring arranged within the casing 23 and having a coil 37 which is mounted on a pin 38 which is carried by the frame head 10, and one arm 39 of this spring engaging with the inner side of the casing 23, while the other arm 40 thereof engages with an opening 41 formed in a laterally projecting lug 42 on the outer end of the yoke shifting arm 35, as best shown in Figs. 3 and 5.

The inner control roller is rotatably mounted at its opposite ends on pivot pins or trunnions 43 which are carried by lugs 44 on the intermediate parts of two arms 45 which form part of a support or yoke which carries the inner control roller. In the preferred construction the lower or inner ends of the arms 45 are pivoted by means of pins 46 on the inner sides of the arms 29 of the outer control yoke between the axis of the trunnions 32 thereof and the pivot pins 34 of the outer control roller, as shown in Figs. 1, 2, 5, and 6.

The two arms 45 of the inner control yoke are preferably connected so that they rock in unison, this being preferably accomplished by means of a longitudinal bar 47 connecting the upper or outer ends of these arms, as shown in Figs. 1, 2, and 6.

The outer and inner control rollers have a length equal to the distance between the inner contracted parts 20 of the disks or flanges of the spool, and these rollers are so mounted that the ends of the same are in line with the inner sides of the spool flanges and are capable of moving radially toward and from the axis of the spool, whereby the inner or upper roller is able to follow the increasing and decreasing diameter of the wound part of the line on the spool, and to constantly engage therewith as the line is unwound therefrom and rewound thereon while in use.

In order to enable the inner control roller to thus remain in engagement with the periphery of the wound part of the fish line when the latter has been reduced to a comparatively small diameter, the supporting yoke for this inner roller is so constructed that it will permit of the bodily inward movement of the inner control roller to the requisite extent. For this purpose the heads 48 of the inner control roller are offset inwardly from opposite ends of this roller and the pivot lugs 44 are also offset inwardly from the arms 45 of the inner control yoke. When these lugs engage the outer sides of the inner roller heads 48 these lugs will be arranged wholly within this roller, as shown in Fig. 4, and thereby prevent these lugs from striking the annular shoulders formed on the flanges of the spool between the inner narrow and the wide outer parts thereof, and thus permit the inner control roller to move inwardly toward the axis of the spool to the maximum extent for controlling the operation of the reel, so as to prevent back-lash of the line.

The inner control yoke is moved inwardly together with the inner control roller mounted thereon so that these parts tend constantly to move inwardly under yielding pressure and to hold the inner control roller yieldingly in engagement with the periphery of the wound part of the line on the spool. The spring means for accomplishing this purpose may be variously constructed, but as shown in the drawing, these consist of a wire spring 49 which has one end secured to a lug 50 projecting outwardly from the main frame head 10, while the opposite end of this spring bears against the outer side of the longitudinal yoke bar 47, as shown in Figs. 1 and 3.

Outward movement of the inner yoke and the inner control roller mounted thereon is limited by stop means which preferably consist of two stop lugs 51 formed on the upper front parts of the frame heads 10 and 11 and overhanging the upper ends of the yoke arms 45 and the adjacent part of the longitudinal bar 47 connecting the same, whereby these stop lugs will be engaged by these arms and bar of the inner control roller, as shown in Fig. 2, for limiting the movement of the inner control roller away from the spool while operating the reel.

When only a moderate pull is exerted on the fishing line when casting the bait or white playing a fish which has been caught, the inner control roller 27 engages its periphery with the wound up part of the fishing line on the spool, whereby the rotary movement which is imparted to the spool by the unwinding of the line therefrom will be transmitted to the inner control roller, and thence from the latter to the outer control roller so that both rollers and the spool move at the same peripheral speed.

No dragging effect is therefore produced on the line which would have a tendency to wear or chafe the same, and consequently weaken its strength. The instant that the pull on the line ceases the unwinding rotation of the spool is also instantly arrested by reason of the engagement therewith of the inner control roller, which latter operates as a detent to prevent such unwinding movement of the spool at this time.

This effect is aided by the retarding action of the outer control roller which exerts a pressure against the inner control roller through the medium of the fishing line which is interposed between the same. The combined effect of these elements therefore operates to prevent the spool from over-running when the pull on the fishing line ceases, thereby avoiding paying out any fishing line between the reel and the control rollers which is slack, and also prevents any back-lash of the line about the reel, so that at no time is there any free or unwound fishing line between the reel and the control rollers which would cause the same to become snarled and interfere with the proper use of the reel.

If during the operation of casting a bait or playing a fish which has been caught, a pull is exerted upon the fishing line which is more than normal, then the control roller 27 may be pulled slightly away from contact with the wound part of the line on the spool, but the instant that this abnormally strong pull ceases the inner control roller is immediately moved inwardly against the periphery of the wound part of the line, and thereby prevents over-running of the spool and paying out loose line which would be liable to become snarled or tangled.

In the case of an extraordinarily strong pull on the line it is also possible that the outer control roller 28 is momentarily drawn slightly away from the inner control roller while the latter is out of engagement from the line on the spool, but when this occurs these rollers will also be quickly returned by the spring means associated therewith for re-engaging the inner control roller with the line on the spool, and also re-engaging the outer control roller with the inner control roller before the spool is uncontrolled to any appreciable extent, and thereby avoids over-running of the spool or back-lash in the line, which otherwise might produce objectionable paying out of the line from the spool.

If for any reason a violent pull is suddenly exerted upon the line which would tend to move both the control rollers away from the spool an undue extent, such undue movement is prevented by engagement of the inner control yoke with the stop means 51 on the frame of the reel. These stop means also prevent undue outward movement of the inner control yoke while manipulating the parts of the reel during operation of removing an old line and replacing the same by a new line, thereby avoiding the possibility of disarranging the relative positions of the operative parts of the reel.

If desired, an even-winding device may be embodied in this reel for the purpose of causing the fish line as it is wound upon the spool to be distributed evenly over the length of the axle between the flanges thereof. These means may be similar to those now in common use, and as shown in Figs. 1, 2, 3, 4, and 5 the same comprise an evener shaft 52 journaled in bearings formed in the arbors 32 of the outer roller supporting yoke, and provided with a reversely running thread 53, a carriage 54 movable lengthwise on this evener shaft and provided with a pivoted tracer or shoe 55 which engages with the thread 53, a guide loop or bail 56 projecting upwardly from the carriage 54 and adapted to receive the fish line, and means for rotating this evener shaft consisting of a gear wheel 57 connected with the hand crank 24 and meshing with a gear wheel 58 upon one end of the evener shaft 52, these gear wheels 57 and 58 being arranged within the casing 23, as best shown in Fig. 3.

As the evener shaft is turned in one direction or the other by the hand crank 24 through the medium of the intermediate gearing the carriage 54 moves back and forth lengthwise of the reel, together with the distributing bail or loop 56, and thereby causes the line to be wound or distributed evenly over the axle of the spool between the flanges or disks thereof in a well-known manner.

In the preferred construction the upper or free end of the guide loops or bail 56 runs in a longitudinal guideway or groove 59 formed on the underside of the longitudinal bar 30 which forms part of the yoke or auxiliary frame which carries the outer control roller, as best shown in Figs. 2 and 3, thereby holding these parts in their proper operative relation.

The advantages which are obtained in this improved reel are accomplished by means which are comparatively simple in construction and not liable to get out of order. Moreover, this mechanism is so organized that the same is very compact, the several elements are readily accessible for inspection, adjustment and repairs, and the fishing line can be readily and easily mounted on the reel as well as removed therefrom when replacement becomes necessary.

I claim as my invention:

1. A fishing reel comprising a main frame, a spool rotatably mounted on the frame and adapted to receive the fishing line, an inner roller movable toward and from the wound part of the line on said spool, an outer roller which is movable toward and from said inner roller and between which and said inner roller the fishing line is adapted to pass to and from the spool and yielding means for moving said inner roller toward said spool and said outer roller toward said inner roller.

2. A fishing reel comprising a main frame, a spool rotatably mounted on the frame and adapted to receive the fishing line, an inner roller movable toward and from the wound part of the line on said spool, an outer roller which is movable toward and from said inner roller and between which and said inner roller the fishing line is adapted to pass to and from the spool, an outer rocking support mounted on said frame and carrying said outer roller, an inner rocking support carrying said inner roller and yielding means for moving said inner and outer supports inwardly.

3. A fishing reel comprising a main frame, a spool rotatably mounted on the frame and adapted to receive the fishing line, an inner roller movable toward and from the wound part of the line on said spool, an outer roller which is movable toward and from said inner roller and between which and said inner roller the fishing line is adapted to pass to and from the spool, an outer rocking support mounted on said frame and carrying said outer roller, an inner rocking support mounted on said outer rocking support and carrying said inner roller an inner spring for moving said inner support toward said spool, and an outer spring for moving said outer support inwardly independently of said inner spring.

4. A fishing reel comprising a main frame, a spool rotatably mounted on the frame and adapted to receive the fishing line, an inner roller movable toward and from the wound part of the line on said spool and yieldingly held in engagement therewith, an outer roller which is yieldingly moved toward said inner roller and between which and said inner roller the fishing line is adapted to pass to and from the spool, an outer rocking support mounted on said frame and carrying said outer roller, an inner rocking support carrying said inner roller, and spring means for yieldingly moving said rollers toward each other and toward said spool.

5. A fishing reel comprising a main frame, a spool rotatably mounted on the frame and adapted to receive the fishing line, an inner roller movable toward and from the wound part of the line on said spool and yieldingly held in engagement therewith, an outer roller which is yieldingly moved toward said inner roller and between which and said inner roller the fishing line is adapted to pass to and from the spool, an outer rocking support mounted on said frame and carrying said outer roller, an inner rocking support mounted on said outer rocking support and carrying said inner roller, spring means interposed between the main frame and the inner rocking support for yieldingly moving the latter inwardly, and spring means interposed between said inner and outer supports and operating to move said outer support inwardly.

6. A fishing reel comprising a main frame, a spool rotatably mounted on said frame and adapted to receive the fish line, an inner roller movable toward and from the line wound on the reel, an inner rocking support carrying said inner roller, stop means for limiting the outward movement of said inner support, an outer roller between which and the inner roller the fishing line is adapted to pass, and spring means for yieldingly moving said supports inwardly.

7. A fishing reel comprising a main frame, a spool rotatably mounted on said frame and adapted to receive the fish line, an inner roller movable toward and from the line wound on the reel, an inner rocking support carrying said inner roller, an outer roller between which and said inner roller the fishing line is adapted to pass, an outer rocking support including a shaft journaled on said main frame and provided with arms on which said outer roller is pivoted, and means for yieldingly moving said outer support inwardly including a tension arm connected with said shaft, and a spring interposed between said tension arm and main frame.

8. A fishing reel comprising a main frame, a spool rotatably mounted on said frame and adapted to receive the fish line, an inner roller movable toward and from the line wound on the reel, an inner rocking support carrying said inner roller, an outer roller between which and said inner roller the fishing line is adapted to pass, an outer rocking support including rock arms which are pivoted at one end on said frame and upon which said outer roller is mounted, a cross bar connecting said arms, spring means for moving said outer rocking frame inwardly, and means for winding the line evenly on the spool including a reversely threaded shaft journaled concentrically with the pivotal connection between said arms and main frame, a carriage movable lengthwise of said shaft and having a tracer engaging the thread thereof, and a distributing loop mounted on said carriage and receiving the fishing line.

9. A fishing reel comprising a main frame, a spool rotatably mounted on said frame and adapted to receive the fish line, an inner roller movable toward and from the line wound on the reel, an inner rocking support carrying said inner roller, an outer roller between which and said inner roller the fishing line is adapted to pass, an outer rocking support including rock arms which are pivoted at one end on said frame and upon which said outer roller is mounted, a cross bar connecting said arms, spring means for moving said outer rocking frame inwardly, and means for winding the line evenly on the spool including a reversely threaded shaft journaled concentrically with the pivotal connection between said arms and main frame, a carriage movable lengthwise of said shaft and having a tracer engaging the thread thereof, a distributing loop mounted on said carriage and receiving the fishing line, and a guide-way on said bar in which said distributing loop slides.

10. A fishing reel comprising a main frame having two end heads, a spool arranged within the frame and rotatably mounted on the heads thereof and adapted to receive the fish line, an inner roller movable toward and from the wound part of the line on the spool, an outer roller between which and the inner roller the line is adapted to pass to and from the spool, an outer rocking support having arms which are pivoted on said heads and on which said outer roller is journaled, and an inner rocking support having arms which are pivoted on the arms of said outer support and on which said inner roller is journaled, and a cross bar connecting the arms of said inner support.

11. A fishing reel comprising a main frame having two end heads, a spool arranged within the frame and rotatably mounted on the heads thereof and adapted to receive the fish line, an inner roller movable toward and from the wound part of the line on the spool, an outer roller between which and the inner roller the line is adapted to pass to and from the spool, an outer rocking support having arms which are pivoted on said heads and on which said outer roller is journaled, an inner rocking support having arms which are pivoted on the arms of said outer support and on which said inner roller is journaled, and a cross bar connecting the arms of said inner support, and stops on said frame for limiting the outward movement of said inner rocking support.

12. A fishing reel comprising a main frame having two end heads, a spool arranged within the frame and rotatably mounted on the heads thereof and adapted to receive the fish line, an inner roller movable toward and from the wound part of the line on the spool, an outer roller between which and the inner roller the line is adapted to pass to and from the spool, an outer rocking support having arms which are pivoted on said heads and on which said outer roller is journaled, an inner rocking support having arms which are pivoted on the arms of said outer support and on which said inner roller is journaled and a cross bar connecting the arms of said inner support, stops on said frame for limiting the outward movement of said inner rocking support, spring means for moving said inner rocking support inwardly, and spring means for moving said outer rocking support inwardly.

ROBERT MAXWELL JAMES.